(12) United States Patent
Delaune et al.

(10) Patent No.: US 10,378,892 B2
(45) Date of Patent: Aug. 13, 2019

(54) SYSTEM AND METHOD FOR INSPECTING SURFACE FLUSHNESS

(71) Applicants: Michael J. Delaune, Fort Worth, TX (US); William B. Buchanan, Arlington, TX (US)

(72) Inventors: Michael J. Delaune, Fort Worth, TX (US); William B. Buchanan, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 823 days.

(21) Appl. No.: 14/257,416

(22) Filed: Apr. 21, 2014

(65) Prior Publication Data

US 2015/0300817 A1  Oct. 22, 2015

(51) Int. Cl.
*G01B 21/16* (2006.01)
*G01B 21/24* (2006.01)

(52) U.S. Cl.
CPC ............. *G01B 21/24* (2013.01); *G01B 21/16* (2013.01)

(58) Field of Classification Search
None
See application file for complete search history.

(56) References Cited

U.S. PATENT DOCUMENTS

| | | | |
|---|---|---|---|
| 4,498,776 A | 2/1985 | Smith | |
| 4,541,721 A | 9/1985 | Dewar | |
| 4,606,129 A | 8/1986 | Barrowman et al. | |
| 4,666,303 A | 5/1987 | Pryor | |
| 5,129,010 A | 7/1992 | Higuchi et al. | |
| 5,416,590 A * | 5/1995 | Stover | G01B 11/14 356/623 |
| 5,999,265 A * | 12/1999 | Dalancon | G01B 11/14 250/559.24 |

(Continued)

FOREIGN PATENT DOCUMENTS

| | | |
|---|---|---|
| EP | 0132200 A1 | 1/1985 |
| EP | 1355126 A1 | 10/2003 |

(Continued)

OTHER PUBLICATIONS

EPO Germany—Communication re: Extended European Search report for Application No. / Patent No. 15164409.3-1558; Ref. EP 98883PE302cho; Sep. 24, 2015 (Sep. 24, 2015), Sep. 24, 2015.

(Continued)

*Primary Examiner* — Alexander Satanovsky
*Assistant Examiner* — Brent A. Fairbanks
(74) *Attorney, Agent, or Firm* — Baker Botts L.L.P.

(57) ABSTRACT

A system includes one or more memory devices operable to store surface profile data and a processor operable to execute logic. The processor accesses the surface profile data for a first surface of a first component and a second surface of a second component, and determines, based at least in part on the surface profile data for the first and second surfaces, a best-fit between the first and second surfaces. The processor determines a first distance from a first edge-of-part point on the first surface to the best-fit, and a second distance from a second edge-of-part point on the second surface to the best-fit. The processor determines a flushness between the first surface and the second surface based at least in part on the first and second distances.

20 Claims, 4 Drawing Sheets

(56) References Cited

U.S. PATENT DOCUMENTS

| | | |
|---|---|---|
| 6,122,065 A | 9/2000 | Gauthier |
| 6,476,353 B2 | 11/2002 | Chamberlain et al. |
| 6,529,283 B1 | 3/2003 | Demopoulos et al. |
| 6,789,427 B2 | 9/2004 | Batzinger et al. |
| 7,143,494 B2 | 12/2006 | Savoy |
| 7,925,075 B2 | 4/2011 | Jia et al. |
| 7,957,825 B2 | 6/2011 | Marsh et al. |
| 8,768,659 B2 * | 7/2014 | Vasudevan ............ G06F 17/18 703/2 |
| 2004/0120568 A1 * | 6/2004 | Kidd ..................... G01B 21/16 382/141 |
| 2004/0263840 A1 | 12/2004 | Segall et al. |
| 2008/0137088 A1 * | 6/2008 | Wagner ................. G01B 11/24 356/446 |
| 2012/0290243 A1 | 11/2012 | Grigoleit et al. |
| 2013/0287288 A1 * | 10/2013 | Bendall ................ G06T 7/0004 382/154 |

FOREIGN PATENT DOCUMENTS

| | | |
|---|---|---|
| EP | 2208963 A1 | 7/2010 |
| EP | 2423639 A1 | 2/2012 |
| GB | 2284258 A | 5/1995 |
| JP | 09-014931 A | 1/1997 |
| WO | WO 2005/035344 A1 | 4/2005 |
| WO | WO 2009/112761 | 9/2009 |

OTHER PUBLICATIONS

Japanese Office Action; Notice of Reason(s) for Rejection with English translation; JP Patent Application No. 2015-083992; dated Jan. 29, 2019; 6 pages.

Japanese Office Action; Notice of Reason(s) for Rejection with English translation; Japan Patent Application No. 2015-083992; dated Apr. 23, 2019; 4 total pages.

* cited by examiner

SYSTEM AND METHOD FOR INSPECTING SURFACE FLUSHNESS

GOVERNMENT INTEREST

This invention was made with government support under Contract No. N00019-02-C-3002 awarded by the Department of The Navy. The government has certain rights in the invention.

TECHNICAL FIELD

This disclosure generally relates to quality control systems, and more particularly to a system and method for inspecting surface flushness.

BACKGROUND

In many instances, the components of vehicles, machinery, or other products may be designed to fit together in a particular manner. Often, obtaining a proper fit of certain components may be necessary to ensure proper operation or use of the vehicle, machine, or other product. Ensuring that components fit together as required may be even more important after repair or replacement operations are performed. In determining whether components fit together as intended, it may be desirable to inspect the surface flushness of the components.

SUMMARY OF EXAMPLE EMBODIMENTS

According to embodiments of the present disclosure, disadvantages and problems associated with previous techniques for inspecting surface flushness of components may be reduced or eliminated.

In certain embodiments, a system for inspecting surface flushness includes one or more memory devices operable to store surface profile data and a processor operable to execute logic. The processor accesses the surface profile data for a first surface of a first component and a second surface of a second component, and determines, based at least in part on the surface profile data for the first and second surfaces, a best-fit between the first and second surfaces. The processor determines a first distance from a first edge-of-part point on the first surface to the best-fit, and a second distance from a second edge-of-part point on the second surface to the best-fit. The processor determines a flushness between the first surface and the second surface based at least in part on the first and second distances.

Certain embodiments of the present disclosure may provide one or more technical advantages. For example, unlike traditional methods that may examine the fit of each adjacent part separately, in certain embodiments a best-fit is determined across the first surface of the first component and the second surface of the second component using surface profile data for the first and second surfaces. Thus, in certain embodiments the best-fit may be an approximation of the theoretical intended surface per design, taking into account the surfaces of both components. Additionally, in certain embodiments, the accuracy of the best-fit may be advantageously improved by increasing the number of surface data points used to generate the surface profile data of the first and second surfaces. In certain embodiments, the surface data points are taken from larger lengths of the first and second surfaces. The use of more surface data points across a larger length of the first and second surfaces may advantageously reduce errors induced by slight surface imperfections, such as variations that may result from multiple coating layers on a particular surface.

Another advantage of certain embodiments of the present disclosure is reproducibility and repeatability. Existing systems for measuring surface flushness may be subject to wide variation in the mathematics used, especially with regard to setting a reference axis by which distances are calculated. The resulting discrepancies between the existing measurement systems and basic measurement tools, such as feeler gauges, gauge blocks, or calipers, discrepancies were common and difficult to explain. Unlike traditional approaches, the best-fit in certain embodiments is used to establish a rigid reference axis in relation to the best-fit. This provides assurance that inaccurate flushness readings are not a bi-product of embedded software mathematics of the measurement device. Additionally, the mathematics of some embodiments closely align to basic measurement processes and have a defined correlation by which to assess field condition of the problem. Thus, the added predictability and correlation of the measurement system values compared to basic measurement techniques used in the field may eliminate problems of determining how a product relates to its initial condition after repair or replacement processes have been implemented. Furthermore, the repeatability and reproducibility offered by certain embodiments ensures that tight tolerances for the fit of components relative to each other can be verified.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Embodiments of the present invention and its advantages are best understood by referring to FIGS. 1-4, like numerals being used for like and corresponding parts of the various drawings.

Part-to-part surface flushness is a critical feature of many designs, including aircraft, automobiles, machinery, and other products. More and more products are being designed with highly sculpted contours that take advantage of advancements in machining, composites, and plastics manufacturing. Inspecting the surface flushness between mating parts is very difficult in these applications.

Historically, surface flushness has been measured with a variety of basic measurement tools such as feeler gauges, gauge blocks, and calipers. One technique for measuring surface flushness involves developing curve fits for each adjacent part separately, projecting those surfaces across the gap between parts, and calculating mismatch as the distance between curves at the center of the gap. Among a number of problems associated with such an approach is that it lacks the repeatability and reproducibility characteristics across the user community that may be necessary to verify tight tolerances. For example, such an approach can use a variety of mathematics to set the reference axis by which distance is calculated. This may be undesirable because the reference axis changes from one measurement to another measurement based upon the geometry and mathematics applied. This tendency towards change in the reference axis from one measurement to another creates problems in replicating results.

In many cases, reference axis calculations embedded within measurement system software are not replicable outside of the measurement device. Thus, when cross-checking measurements using other basic measurement techniques (such as the feeler gauges, gauge blocks, or calipers mentioned above), it may be difficult or impossible to explain different results without extensive investigation and measurement of both the product and the mathematical analyses.

In certain embodiments of the present disclosure, a system and method for inspecting surface flushness significantly reduces erroneous, misleading measurements and provides consistent, meaningful measurements for engineering and production. In certain embodiments, the method uses surface profile data (for example, laser measurement system data) depicting the surfaces of adjacent parts to develop a best-fit across both parts as an approximation of the theoretical, intended surface per design, and measures flushness from edge-of-part points on the first and second components to the best-fit. In certain embodiments, the method may include a correction factor equation that adjusts for situations where the best-fit is not a good fit with either of the part surfaces.

Figure 1:
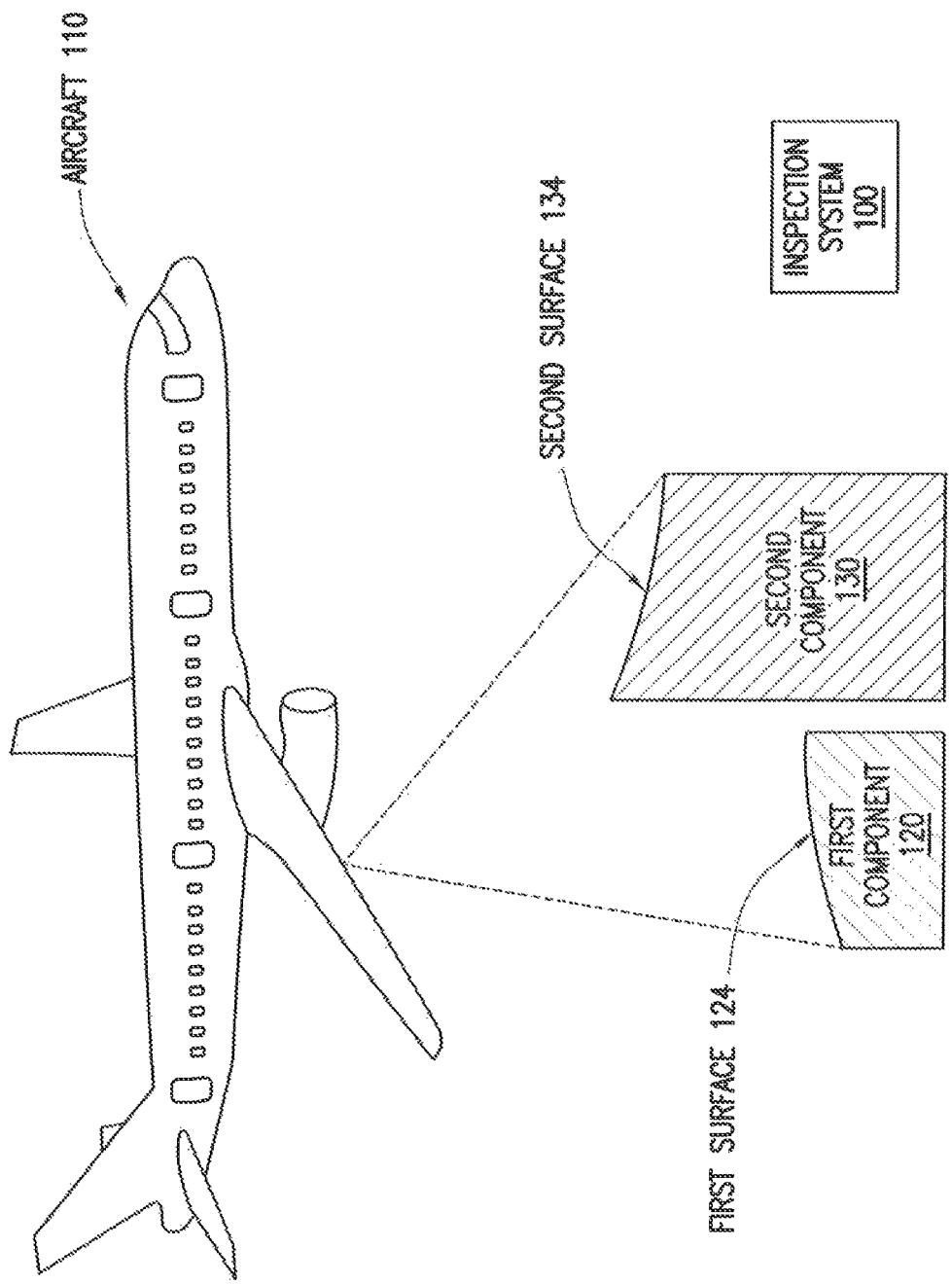
FIG. 1 illustrates an environmental view of component parts having a surface flushness that may be inspected in accordance with certain embodiments.

FIG. 1 illustrates an environmental view of component parts having a surface flushness that may be measured in accordance with certain embodiments. In certain embodiments, a vehicle, machine, or other product may have a number of components that must fit together in a particular way. As an example, and as illustrated in FIG. 1, an aircraft 110 may have a first component 120 and a second component 130 that must fit together in a particular way. Although FIG. 1 illustrates an aircraft 110, the present disclosure contemplates the use of inspection system 100 to measure the surface flushness of any suitable components of any suitable vehicle, machine, or other product.

Aircraft 110 may include a number of components. For example, aircraft 110 may have a first component 120 and a second component 130. In certain embodiments, first component 120 may have a first surface 124 and second component 130 may have a second surface 134. In certain embodiments, first component 120 and second component 130 may be designed to fit together in a particular way. As an example, and not by way of limitation, first surface 124 of first component 120 may align with second surface 134 of second component 130 in a particular way.

In general, it may be desirable to determine that first component 120 and second component 130 fit together as intended. A proper fit between first component 120 and second component 130 may be required or desired for a variety of reasons, such as safety, proper operation, or meeting of required tolerances in a vehicle or machine, such as aircraft 110. As a result, in many instances it may be desirable to confirm that first component 120 and second component 130 fit as intended. For example, it may be desirable to confirm that first component 120 and second component 130 fit together as intended before allowing aircraft 110 to leave a manufacturing facility. As another example, it may be desirable to confirm that first component 120 and second component 130 fit together as intended before allowing operation of aircraft 110 after completion of repairs. In such circumstances, it may be desirable to confirm that the surface flushness of first component 120 and second component 130 is as intended.

In general, inspection system 100 uses surface profile data of first surface 124 and second surface 134 to develop a best-fit across first component 120 and second component 130. In certain embodiments, the best-fit across first component 120 and second component 130 may be a line (such as best-fit line 150 described in FIG. 2 below). In certain embodiments, the best-fit across first component 120 and second component 130 may be a quadratic curve. Although certain embodiments described below may illustrate a best-fit line, the present disclosure contemplates that a best-fit curve may be used. In certain embodiments, surface profile data for first surface 124 and second surface 134 may be laser measurement system data. In certain embodiments, surface profile data may be generated using light interferometry. In certain other embodiments, surface profile data may be generated in any suitable manner. In certain embodiments, inspection system 100 measures flushness from an edge-of-part point to the best-fit.

In general, inspection system 100 produces results that closely align to those of basic measurement techniques (such as feeler gauges, gauge blocks, and calipers). This may advantageously allow production assembly personnel, inspectors, and engineers to easily interpret measurement results, and provides a defined correlation by which field condition of a product may be assessed. Additionally, certain embodiments of inspection system 100 may reduce error resulting from slight imperfections in surfaces 124 and 134. In certain embodiments, bias of the best-fit resulting from small surface imperfections may be reduced by using more surface points along a longer length of surfaces 124 and 134 in defining the best-fit.

Figure 2:
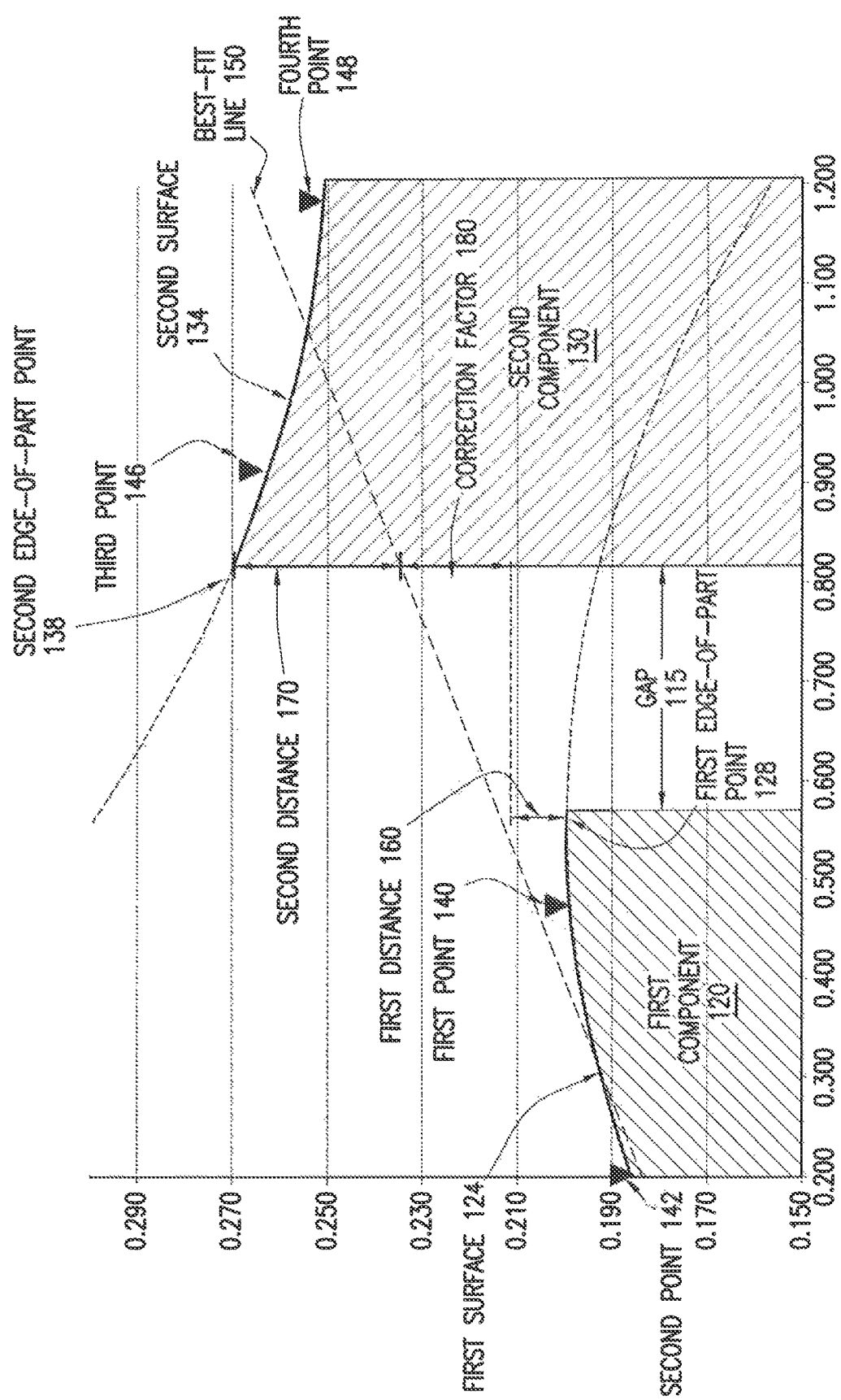
FIG. 2 illustrates the application of an inspection system according to certain embodiments.

FIG. 2 illustrates an application of inspection system 100 according to certain embodiments. As noted above, two component parts of a vehicle, machine, or other product, such as aircraft 110 shown in FIG. 1, may be adapted to fit together in a particular manner. In order to determine if the two components fit together properly, it may desirable to measure the surface flushness of the two components. According to certain embodiments of inspection system 100, a surface flushness of a first component 120 and a second component 130 is determined in a manner that produces reliable, reproducible results and can accommodate complex surfaces. In certain embodiments, inspection system 100 may be a software component of a measurement device. As an example, and not by way of limitation, inspection system 100 may be a software component of the GapGun Software from Third Dimension.

As illustrated in FIG. 2, a first component 120 and a second component 130 may be designed to fit together in a particular manner. In certain embodiments, first component 120 may have a first surface 124. In certain embodiments, first surface 124 may have a first edge-of-part point 128. In certain embodiments, first surface 124 may also have a first point 140 and a second point 142.

In certain embodiments, first edge-of-part point 128 may be defined as the point on first surface 124 nearest to a gap 115 between first component 120 and second component 130. In certain embodiments, inspection system 100 may be adapted to determine a distance between first edge-of-part point 123 and a best-fit line 150. In certain embodiments, first edge-of-part point 128 may be used as a reference for determining the locations of first point 140 and second point 142 on first surface 124. As an example, and not by way of limitation, first point 140 may be located a predetermined distance from first edge-of-part point 128.

In certain embodiments, inspection system 100 may use first point 140 and second point 142 to establish the boundaries of a portion of first surface 124 from which surface profile data may be generated. In certain embodiments, the distance between first point 140 and second point 142 may be fixed. For example, fixing the distance between first point 140 and second point 142 may be an element of a quality control procedure. In certain other embodiments, the distance between first point 140 and second point 142 may be adjusted. In certain embodiments, the distance between first point 140 and second point 142 may be substantially equal to the distance between a third point 146 and a fourth point 148 on second surface 134 of second component 130.

In certain embodiments, surface profile data may depict first surface 124 of first component 120. In certain embodiments, surface profile data may be generated using laser measurements or any other suitable means. In certain embodiments, first point 140 may be located a first predetermined distance from first edge-of-part point 128. In certain embodiments, inspection system 100 may be adapted to generate surface profile data for a portion of first surface 124 located between first point 140 and second point 142 on first surface 124. In certain embodiments, inspection system 100 may be adapted to access surface profile data previously generated for the portion of first surface 124 located between first point 140 and second point 142. In certain embodiments, the surface profile data for the portion of first surface 124 between first point 140 and second point 142 may be generated using light interferometry. In certain other embodiments, surface profile data for the portion of first surface 124 between first point 140 and second point 142 may be generated using any suitable technique.

In certain embodiments, the number of surface data points used to generate the surface profile data used by inspection system 100 may be increased to reduce errors induced by slight imperfections in first surface 124. As an example, and not by way of limitation, components such as first component 120 may have variations or slight imperfections resulting from multiple coating layers. As another example, if only a small length of a component such as first component 120 is visible and appropriate for measurement input, such small lengths of data can often generate the wrong perception of product condition. In existing measurement systems, these slight imperfections could bias curve fits, resulting in curve fit projections off the edge of a part, such as component 120, that are not reasonable approximations of the theoretical, intended surface per design. In certain embodiments of the present disclosure, this problem is ameliorated by increasing the number of surface data points used, which may advantageously render such embodiments less susceptible to surface waviness or noise caused by such imperfections.

Similarly, in certain embodiments second component 130 may have a second surface 134. In certain embodiments, second surface 134 may have a second edge-of-part point 138. In certain embodiments, second surface 134 may also have a third point 146 and a fourth point 148.

In certain embodiments, second edge-of-part point 138 may be defined as the point on second surface 134 nearest to the gap 115 between first component 120 and second component 130. In certain embodiments, inspection system 100 may be adapted to determine a distance between second edge-of-part point 138 and best-fit line 150. In certain embodiments, second edge-of-part point 138 may be used as a reference for determining the locations of third point 146 and fourth point 148 on surface 134. As an example, and not by way of limitation, third point 146 may be located a predetermined distance from second edge-of-part point 138.

In certain embodiments, inspection system 100 may use third point 146 and fourth point 148 to establish the boundaries of a portion of second surface 134 that may be used for generating surface profile data. In certain embodiments, the distance between third point 146 and fourth point 148 may be fixed. For example, fixing the distance between third point 146 and fourth point 148 may be an element of a quality control procedure. In certain other embodiments, the distance between third point 146 and fourth point 148 may be adjusted. In certain embodiments, the distance between third point 146 and fourth point 148 may be substantially equal to the distance between first point 140 and second point 142 on first component 120.

In certain embodiments, surface profile data may depict second surface 134 of second component 130. In certain embodiments, surface profile data may be generated using laser measurements or any other suitable means. In certain embodiments, third point 146 may be located a second predetermined distance from second edge-of-part point 138. In certain embodiments, the first predetermined distance between first edge-of-part point 128 and first point 140 may be equal to the second predetermined distance between second edge-of-part point 138 and third point 146. In certain embodiments, inspection system 100 may be adapted to generate surface profile data for a portion of second surface 134 located between third point 146 and fourth point 148 on second surface 134. In certain embodiments, inspection system 100 may be adapted to access surface profile data generated for the portion of second surface 134 located between third point 146 and fourth point 148. In certain embodiments, the surface profile data for the portion of second surface 134 between third point. 146 and fourth point 148 is generated using light interferometry. In certain other embodiments, surface profile data for the portion of second surface 134 between third point 146 and fourth point 148 may be generated using any suitable technique.

As noted above with respect to first surface 124, the number of surface data points used to create the surface profile data for second surface 134 may be increased to reduce errors in best-fit line 150 that may be induced by slight imperfections in second surface 134. Increasing the number of surface data points used to generate surface profile data for second surface 134 may offer similar advantages to those discussed above with respect to first surface 124.

In certain embodiments, the surface profile data generated using surface data points between first point 140 and second point 142 on first surface 124 may be used in combination with the surface profile data generated using surface data points from between third point 146 and fourth point 148 on second surface 134 to determine best-fit line 150. In certain embodiments, best-fit line 150 may be an approximation of the theoretical, intended surface per design. In certain embodiments, best-fit line 150 may be determined using the least squares method. In certain other embodiments, best-fit line 150 may be determined using any suitable method. In certain embodiments, best-fit line 150 may advantageously lack surface waviness or noise because of the number of surface data points used to generate best-fit line 150. Although FIG. 2 illustrates a best-fit line 150, in certain embodiments the best-fit may be a quadratic curve.

In certain embodiments, best-fit line 150 may be used in setting a reference axis. In certain embodiments, inspection system 100 may have a rigid definition of the reference axis In certain embodiments, the reference axis may be set as normal to best-fit line 150 at the center of gap 115 between first component 120 and second component 130. Using a rigid reference axis determined at least in part by best-fit line 150 may advantageously ensure that inaccurate flushness readings are not the bi-product of embedded software mathematics of the measurement device.

In operation, inspection system 100 may determine a flushness between first surface 124 and second surface 134 by summing a first distance 160, a second distance 170, and a correction factor 180. In certain embodiments, first distance 160 may be a distance from the first edge-of-part point 128 on first surface 124 to best-fit line 150, and second distance 170 may be a distance from the second edge-of-part point 138 on second surface 134 to best-fit line 150.

In certain embodiments, correction factor 180 may adjust for situations where best-fit line 150 is not a good fit with either of first surface 124 or second surface 134. Correction factor 180 may be calculated in any suitable manner. For example, in certain embodiments, correction factor 180 may be calculated based on the distance of gap 115 between first component 120 and second component 130, first distance 160, second distance 170, and an intersection component. In certain embodiments, the intersection component may be the sum of a first intersection distance and a second intersection distance. The first intersection distance may be the distance along the contour of first surface 124 from the intersection of best-fit line 150 with first surface 124 to first edge-of-part point 128. The second intersection distance may be the distance along the contour of second surface 134 from the intersection of best-fit line 150 with second surface 134 to second edge-of-part point 138. In certain embodiments, correction factor 180 may be determined by the following equation:

$$\text{Correction Factor } 180 = \frac{\text{Gap } 115 \times (\text{First Distance } 160 + \text{Second Distance } 170)}{\text{Intersection Component}}$$

In general, inspection system 100 provides a system for measuring surface flushness between two components, such as first component 120 and second component 130, that produces reliable and reproducible results. By optimizing the number of surface data points between first point 140 and second point 142 and between third point 146 and fourth point 148, best-fit line 150 is determined that provides an approximation of the theoretical, intended surface per design while not being subject to undesirable variations resulting from slight surface imperfections in first surface 124 or second surface 134.

In certain embodiments, inspection system 100's use of a rigid definition of a reference axis, defined in relation to best-fit line 150, advantageously ensures that inaccurate flushness readings are not the bi-product of embedded software mathematics of a measurement device. The surface flushness determinations of inspection system 100 closely align to basic measurement processes such as feeler gauges, gauge blocks, and calipers, and have a defined correlation by which to assess the condition of a product. Inspection system 100 provides predictability and correlates to measurement techniques often used outside of factory conditions, advantageously allowing a the proper fit of components after repair or replacement to be determined relative to their initial condition.

Figure 3:
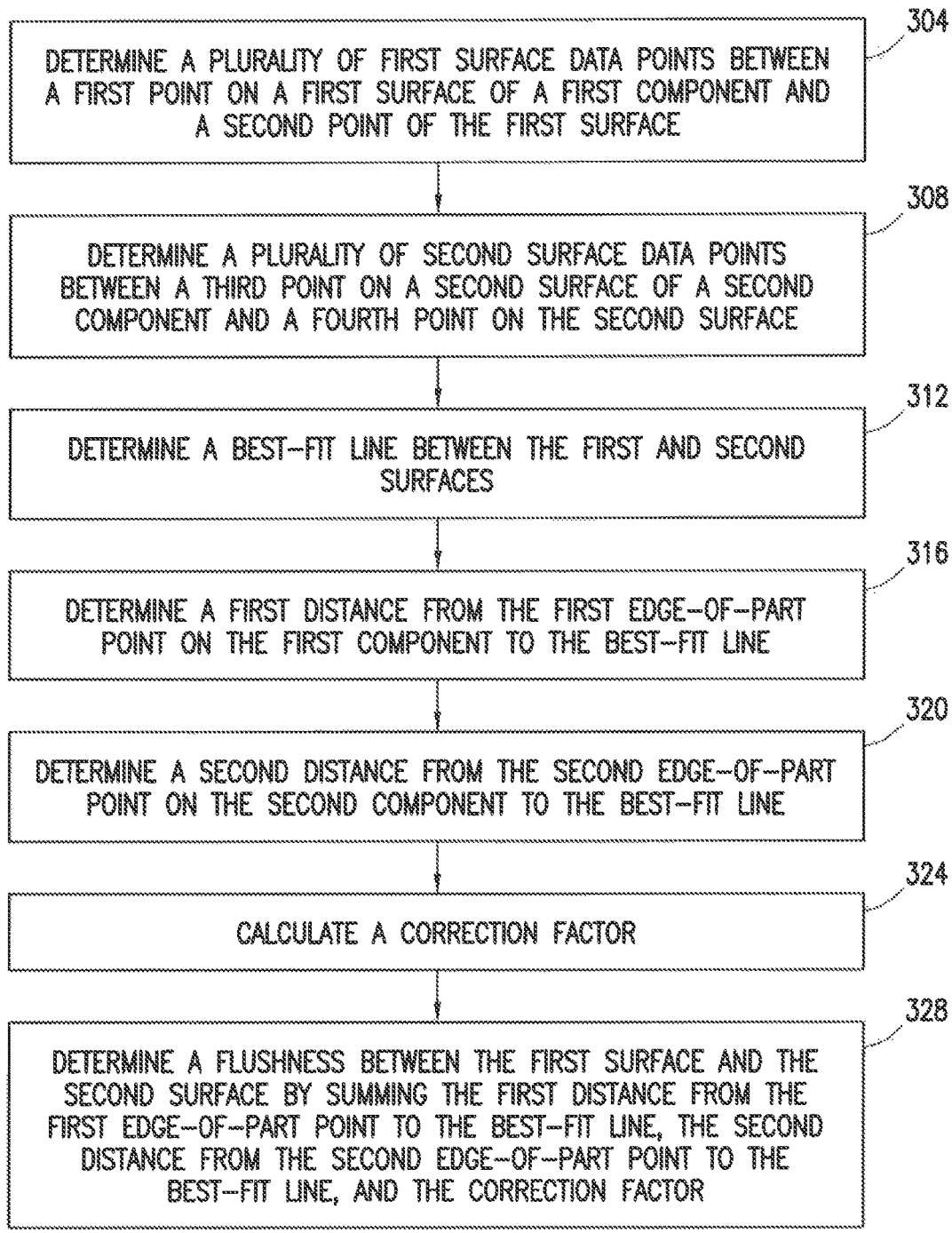
FIG. 3 illustrates a flow chart of a method for inspecting surface flushness according to certain embodiments.

FIG. 3 illustrates a flow chart of a method for inspecting surface flushness according to certain embodiments.

The method begins at step 304 when a plurality of first surface data points between a first point on a first surface of a first component and a second point on the first surface is determined. In certain embodiments, the distance between the first point and the second point may be fixed. As an example, and not by way of limitation, fixing the distance between first point 140 and second point 142 may be an element of a quality control procedure. In certain embodiments, the first point is located a first predetermined distance from the first edge-of-part point of the first component. In certain embodiments, the distance between the first point and the second point on the first surface may be equal to the distance between the third point and the fourth point on the second surface. In certain embodiments, the number of surface data points may be optimized to reduce errors induced by imperfections in the first surface.

At step 308 a plurality of second surface data points between a third point on a second surface of a second component and a fourth point on the second surface is determined. In certain embodiments, the third point may be located a second predetermined distance from a second edge-of-part point on the second component. In certain embodiments, the first predetermined distance between the first edge-of-part point and the first point may be substantially equal to the second predetermined distance between the second edge-of-part point and the third point. In certain embodiments, the distance between the third point and the fourth point may be fixed. In certain embodiments, fixing the distance between first point and second point may improve quality control measures. In certain embodiments, the third point may be located a predetermined distance from the second edge-of-part point of the second component. In certain embodiments, the distance between the third point and the fourth point on the second surface is the same as the distance between the first point and the second point on the first surface. In certain embodiments, the number of surface data points may optimized to reduce errors induced by imperfection in the second surface.

At step 312 a best-fit line between the first and second surfaces is determined based at based at least in part on the plurality of first and second surface data points. In certain embodiments, the best-fit line may be an approximation of the theoretical, intended surface per design. The best-fit line may be generated using any suitable method. As an example, and not by way of limitation, the best-fit line may be determined using the least squares method. In certain embodiments, the best-fit line is used to define a reference axis. As an example, and not by way of limitation, a reference axis may be defined as normal to the best-fit line at the center of a gap between the first component and the second component. Using the best-fit line to establish a rigid reference axis may provide assurance that inaccurate flushness readings are not the bi-product of embedded software mathematics of a measurement device. Advantageously, the mathematics of the inspection system may closely align to basic measurement techniques, such as feeler gauges, gauge blocks, and calipers. Thus, in certain embodiments the present condition of a product after repair or replacement procedures can be more easily compared to its initial condition. Furthermore, because the number of surface data points used to determine the best-fit line may be optimized, errors in the best-fit line resulting from slight imperfections in the first and second surfaces may be reduced. Although the method described in FIG. 3 illustrates the use of a best-fit line, in certain embodiments the best-fit may be a quadratic curve.

At step 316 a first distance from the first edge-of-part point on the first component to the best-fit line is determined. Similarly, at step 320 a second distance from the second edge-of-part point on the second component to the best-fit line is determined.

At step 324 a correction factor is calculated. In certain embodiments, the correction factor may be calculated based on the width of a gap between the first component and the second component, the distance from the first edge-of-part point on the first component to the best-fit line, the distance from the second edge-of-part point on the second component to the best-fit line, and an intersection component. In certain embodiments, the correction factor adjusts for situations where the best-fit line is not a good fit with either of the part surfaces.

At step 328 a flushness between the first surface and the second surface may be determined by summing the first distance from the first edge-of-part point to the best-fit line, the second distance from the second edge-of-part point to the best-fit line, and the correction factor.

In general, an inspection system according to certain embodiments of the present disclosure determines a best-fit line across a first surface of a first component and a second surface of a second component. The best-fit line may be determined using surface profile data depicting a portion of the first and second surfaces. A first distance from the first edge-of-part point to the best-fit line and a second distance from the second edge-of-part point to the best-fit line are determined. A surface flushness for the first and second components may be determined based at least in part on the first and second distances and a correction factor.

In accordance with certain embodiments, the inspection system may advantageously allow a flushness between components to be determined. In certain embodiments, the determined flushness may correlate closely with basic measurement processes, such as feeler gauges, gauge blocks, calipers, and other tools. In certain embodiments, a rigid reference axis based on the best-fit line is used, resulting in a measurement that is both easy to understand and leads to improved interpretation of the measurement result by production assembly personnel, inspectors, and engineers. The reliability and repeatability of the measurement system may advantageously allow the condition of an aircraft, machine, or other vehicle or product, after repairs or replacements have been performed, to be assessed relative to its initial condition.

Figure 4:
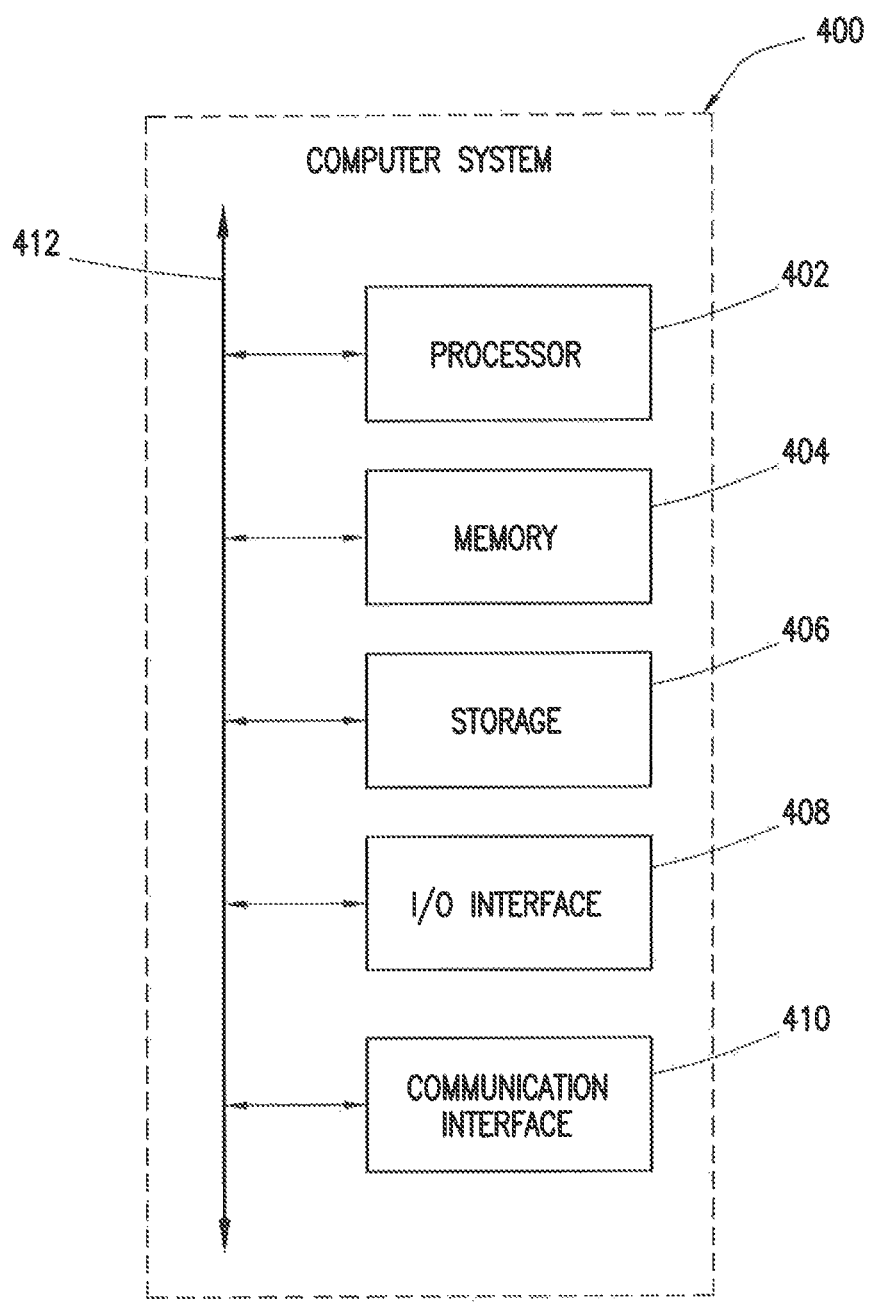
FIG. 4 illustrates an example computer system that may be utilized to inspect surface flushness, according to certain embodiments.

FIG. 4 illustrates an example computer system 400 that may be utilized to inspect surface flushness, according to certain embodiments. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SEC) (such as, for example, a computer-on-module (COM) or system-on-module (SON)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method performed in a measurement device for determining surface flushness, comprising:
    generating, by the measurement device using laser measurements, a plurality of first surface data points between a first point on a first surface of a first component of a vehicle and a second point on the first surface, the first point located a first predetermined distance from a first edge-of-part point on the first component, wherein:
        the first component of the vehicle is assembled together with a second component of the vehicle; and
        the first component of the vehicle and the second component of the vehicle comprise mating parts configured to fit together with an intended surface flushness;
    generating, by the measurement device using laser measurements, a plurality of second surface data points between a third point on a second surface of the second component and a fourth point on the second surface, the third point located a second predetermined distance from a second edge-of-part point on the second component;
    determining, by the measurement device based at least in part on the plurality of first and second surface data points generated using laser measurements, a best-fit across the first and second surfaces, wherein the best-fit provides an approximation of a theoretical intended surface based on the first surface and the second surface, and the best-fit is one of:
        a best-fit line calculated using a least squares method; and
        a best-fit quadratic curve;
    determining, by the measurement device, a first distance from the first edge-of-part point on the first component to the best-fit;
    determining, by the measurement device, a second distance from the second edge-of-part point on the second component to the best-fit;
    calculating, by the measurement device, a correction factor based at least in part on:
        a width of a gap between the first and second components;
        the first distance from the first edge-of-part point on the first component to the best-fit;
        the second distance from the second edge-of-part point on the second component to the best-fit; and
        an intersection component, the intersection component comprising a sum of a first intersection distance and a second intersection distance, wherein:
            the first intersection distance is a distance along a first contour of the first surface from a first intersection of the best-fit with the first surface to the first edge-of-part point; and
            the second intersection distance is a distance along a second contour of the second surface from a second intersection of the best-fit with the second surface to the second edge-of-part point; and
    confirming, by the measurement device, that the assembled first component of the vehicle and the second component of the vehicle fit together with the intended surface flushness based on a flushness between the first surface and the second surface determined by summing the first distance from the first edge-of-part point to the best-fit, the second distance from the second edge-of-part point to the best-fit, and the correction factor.

2. The method of claim 1, wherein:
    a distance between the first and second points is equal to a distance between the third and fourth points; and
    the first and second predetermined distances are substantially equal.

3. The method of claim 1, wherein the number of first and second surface data points is based at least in part on a number of surface data points required to minimize an impact of anomalous surface measurements.

4. The method of claim 1, wherein the best-fit is used to define a reference axis, the reference axis defined as normal to the best-fit line at a center of a gap between the first component and the second component.

5. The method of claim 1, wherein the plurality of first and second surface data points are determined using light interferometry.

6. The method of claim 1, wherein the first edge-of-part point comprises a point on the first surface nearest a gap between the first component and the second component; and
    the second edge-of-part point comprises a point on the second surface nearest the gap between the first component and the second component.

7. The method of claim 1, wherein confirming that the assembled first component of the vehicle and the second component of the vehicle fit together with the intended surface flushness is further based on whether the flushness between the first surface and the second surface meets one or more predetermined required tolerances of the vehicle when assembled.

8. One or more computer-readable non-transitory storage media embodying software that is operable when executed by one or more processors of a measurement device for determining surface flushness to:
    generate, using laser measurements, surface profile data for a first surface of a first component and a second surface of a second component, wherein the first component and the second component comprise assembled components of a vehicle, the first component and the second component comprising mating parts configured to fit together with an intended surface flushness when assembled, and wherein:
        the surface profile data for the first surface of the first component comprises a plurality of first surface data points between a first point on the first surface of the first component and a second point on the first surface; and
        the surface profile data for the second surface of the second component comprises a plurality of second surface data points between a third point on the second surface of the second component and a fourth point on the second surface;
    determine, based at least in part on the surface profile data for the first and second surfaces generated using laser measurements, a best-fit across the first and second surfaces, wherein the best-fit provides an approximation of a theoretical intended surface based on the first surface and the second surface, and the best-fit is one of:
        a best-fit line calculated using a least squares method; and
        a best-fit quadratic curve;
    determine a first distance from a first edge-of-part point on the first component to the best-fit;
    determine a second distance from a second edge-of-part point on the second component to the best-fit; and
    confirm that the first component and the second component fit together with the intended surface flushness based on a flushness between the first surface and the second surface determined based at least in part on the calculated first and second distances.

9. The media of claim 8, wherein the software is operable to generate the surface profile data for the first and second surfaces by:
    determining the plurality of first surface data points between the first point on the first surface and the second point on the first surface, the first point located a first predetermined distance from the first edge-of-part point; and
    determining the plurality of second surface data points between the third point on the second surface and the fourth point on the second surface, the third point located a second predetermined distance from the second edge-of-part point;
    wherein a distance between the first and second points is equal to a distance between the third and fourth points, and the first and second predetermined distances are substantially equal.

10. The media of claim 8, wherein the software is further operable to calculate a correction factor based at least in part on:
    a width of a gap between the first and second components;
    the first distance from the first edge-of-part point on the first component to the best-fit;
    the second distance from the second edge-of-part point on the second component to the best-fit; and
    an intersection component, the intersection component comprising a sum of a first intersection distance and a second intersection distance, wherein:
        the first intersection distance is a distance along a first contour of the first surface from a first intersection of the best-fit with the first surface to the first edge-of-part point; and
        the second intersection distance is a distance along a second contour of the second surface from a second intersection of the best-fit with the second surface to the second edge-of-part point; and
    the determination of flushness between the first surface and the second surface is further based on the correction factor.

11. The media of claim 8, wherein the software is operable to define a reference axis using the best fit, the reference axis defined as normal to the best-fit line at a center of a gap between the first component and the second component.

12. The media of claim 8, wherein the surface profile data is generated using light interferometry.

13. The media of claim 8, wherein the software is operable to determine the flushness between the first surface and the second surface by summing the first distance from the first edge-of-part point to the best-fit, the second distance from the second edge-of-part point to the best-fit, and a correction factor.

14. A system, comprising:
    one or more laser measurement devices configured to generate surface profile data using laser measurements;
    one or more memory devices operable to store the surface profile data generated by the one or more laser measurement devices using laser measurements;
    a processor operable to execute logic, the logic when executed operable to:
        access the surface profile data for a first surface of a first component and a second surface of a second component, wherein the first component and the second component comprise assembled components of a vehicle, the first component and the second component comprising mating parts configured to fit together with an intended surface flushness when assembled, and wherein:
            the surface profile data for the first surface of the first component comprises a plurality of first surface data points between a first point on the first surface of the first component and a second point on the first surface; and the surface profile data for the second surface of the second component comprises a plurality of second surface data points between a third point on the second surface of the second component and a fourth point on the second surface;

determine, based at least in part on the surface profile data for the first and second surfaces, a best-fit across the first and second surfaces, wherein the best-fit provides an approximation of a theoretical intended surface based on the first surface and the second surface, and the best-fit is one of:

a best-fit line calculated using a least squares method; and a best-fit quadratic curve;

determine a first distance from a first edge-of-part point on the first surface to the best-fit;

determine a second distance from a second edge-of-part point on the second surface to the best-fit; and confirm that the first component and the second component fit together with the intended surface flushness based on a flushness between the first surface and the second surface determined based at least in part on the first and second distances.

15. The system of claim 14, wherein the processor is operable to generate the surface profile data for the first and second surfaces by:

determining the plurality of first surface data points between the first point on the first surface and the second point on the first surface, the first point located a first predetermined distance from the first edge-of-part point; and determining the plurality of second surface data points between the third point on the second surface and the fourth point on the second surface, the third point located a second predetermined distance from the second edge-of-part point;

wherein a distance between the first and second points is equal to a distance between the third and fourth points, and the first and second predetermined distances are substantially equal.

16. The system of claim 15, wherein the number of first and second surface data points determined on the first and second surfaces is based at least in part on a number of surface data points required to minimize an impact of anomalous surface measurements.

17. The system of claim 14, wherein the processor is further operable to calculate a correction factor based at least in part on:

a width of a gap between the first and second components;

the first distance from the first edge-of-part point on the first component to the best-fit;

the second distance from the second edge-of-part point on the second component to the best-fit; and an intersection component, the intersection component comprising a sum of a first intersection distance and a second intersection distance, wherein:

the first intersection distance is a distance along a first contour of the first surface from a first intersection of the best-fit with the first surface to the first edge-of-part point; and the second intersection distance is a distance along a second contour of the second surface from a second intersection of the best-fit with the second surface to the second edge-of-part point; and the determination of flushness between the first surface and the second surface is further based on the correction factor.

18. The system of claim 14, wherein the best-fit is used processor is operable to define a reference axis using the best-fit, the reference axis defined as normal to the best-fit line at a center of a gap between the first component and the second component.

19. The system of claim 14, wherein the surface profile data is generated using light interferometry.

20. The system of claim 14, wherein the processor is operable to determine the flushness between the first surface and the second surface by summing the first distance from the first edge-of-part point to the best-fit, the second distance from the second edge-of-part point to the best-fit, and a correction factor.

* * * * *